United States Patent
Zuckerman et al.

[15] 3,635,817

[45] Jan. 18, 1972

[54] WASTE WATER TREATMENT PROCESS

[72] Inventors: Mathew M. Zuckerman, Yonkers; Alan H. Molof, New City, both of N.Y.

[73] Assignee: Envirotech Corporation, Palo Alto, Calif.

[22] Filed: Oct. 17, 1968

[21] Appl. No.: 768,378

[52] U.S. Cl. ................................210/26, 210/28, 210/29, 210/40
[51] Int. Cl. ..........................................................C02c 5/02
[58] Field of Search........................210/2, 18, 24, 42, 51–53, 210/62, 28, 29, 26, 39, 40

[56] References Cited

UNITED STATES PATENTS

| | | | |
|---|---|---|---|
| 3,047,492 | 7/1962 | Gambrel | 210/15 X |
| 3,171,802 | 3/1965 | Rice et al. | 210/53 X |
| 3,171,804 | 3/1965 | Rice | 210/53 |
| 3,423,309 | 1/1969 | Albertson | 210/18 X |
| 1,928,398 | 9/1933 | Urbain | 210/28 |
| 2,171,199 | 8/1939 | Urbain et al. | 210/29 |
| 3,455,820 | 7/1969 | Joyce et al. | 210/40 |

OTHER PUBLICATIONS

Buswell, A. M., The Chemistry of Water and Sewage Treatment, (1928) Chemical Catalog Co., N.Y., pp. 231–238
Chemical Treatment of Sewage, Report of Committee on Sewage Disposal, American Public Health Association, presented at the 64th annual meeting in Milwaukee, Wisc., Oct. 8, 1935, pp. 44–53, relied on

*Primary Examiner*—Michael Rogers
*Attorney*—Richard F. Bojanowski and Robert R. Finch

[57] ABSTRACT

Waste water from industrial and municipal sources is treated in a hydrolysis treatment sequence wherein large soluble organic molecules such as proteins and polysaccharides in the waste water are broken down into small molecules such as amino acids and mono and disaccharides which are more readily adsorbed by activated carbon or other adsorbents. Additional treatment processes may be employed at various stages of the hydrolysis treatment sequence.

15 Claims, 3 Drawing Figures

WASTE WATER TREATMENT PROCESS

This invention relates generally to the treatment of waste water and particularly to an improved process for treating waste water for reuse as a high-quality water by a hydrolysis treatment sequence.

With increased demands for high-quality water for drinking, recreation, industry and other uses and with increased production of contaminated water, there is an increased need for better efficiency in the treatment of waste water from municipal and industrial sources of all kinds. These waste waters contain numerous contaminants, including solid materials, organic matter, and nutrients such as nitrogen and phosphorus.

At present, the most widely employed treatment processes, commonly termed preliminary, primary and secondary treatments, remove most of the solids and organic material in waste water. Preliminary treatment may include, for example, the removal of large objects on a bar screen and the removal of suspended inorganic material in a grit chamber. Primary treatment normally involves the removal of settleable solids by sedimentation. Solids removal can be assisted by the addition of iron or aluminum salts or organic polymers followed by flocculation and settling.

Secondary treatment is usually biological in nature. It may involve trickling filter treatment wherein the waste waters are sprayed over rocks or plasticized support media on which bacteria have been grown, so that the bacteria absorb and oxidize the organic material, or it may involve activated sludge processing wherein the waste water flows into long and narrow aerated tanks where bacteria flocs develop which metabolize the organic material. The waste then flows into a settling tank where the bacteria flocs settle out.

In order to remove substantially all solids, and organic and nutrient materials so as to produce a high-quality water for possible reuse, an additional treatment, commonly termed tertiary treatment, is required. Such tertiary treatment operates on the effluents of a biological secondary treatment process. The degree of tertiary treatment required for a secondary effluent varies with the reuse objectives of the water or the place of discharge. The highest degree of tertiary treatment for a biologically treated secondary effluent is obtained by chemical treatment where colloidal and suspended solids and often phosphates are removed. Following this chemical treatment, air may be blown through the liquid while the liquid is maintained at a high pH causing nitrogen to escape as ammonia gas. Nitrogen removal may be followed by sand filtration for removal of any residual suspended solids and by activated absorption for removal of soluble organic material. The end product may or may not be chlorinated according to its use.

While tertiary treatment achieves a substantial part of its desired goal, such treatment is extremely costly and thus its use is limited. Additionally, the water produced is not consistently of the highest quality since organic material removal is variable.

It is therefore an object of the present invention to provide a waste water treatment process which consistently produces a superior quality reusable water at a reduced cost.

It is an additional object of the present invention to provide a process that will produce a high-quality water directly from a raw or nonbiologically treated waste water without resorting to the sequence of primary, secondary and tertiary treatment.

It is a further object of the present invention to provide a process that will substantially reduce the capital and total operating cost for production of a high-quality reuse water.

In accomplishing these and other objects and in accordance with the invention, raw waste water or nonbiologically treated waste water is hydrolyzed; that is, large soluble organic molecules are broken down into small molecules by chemical or other means. The hydrolyzed waste water is then passed through an appropriate absorber, such as activated carbon, where the small molecules of soluble organic material are readily absorbed. The hydrolysis is preferably accompanied by the removal of suspended solids and the process may include additional steps such as sand filtration or ammonia stripping at various stages.

The invention will be more fully appreciated from the following detailed description of a preferred embodiment thereof taken in conjunction with the appended drawings wherein.

Figure 1:
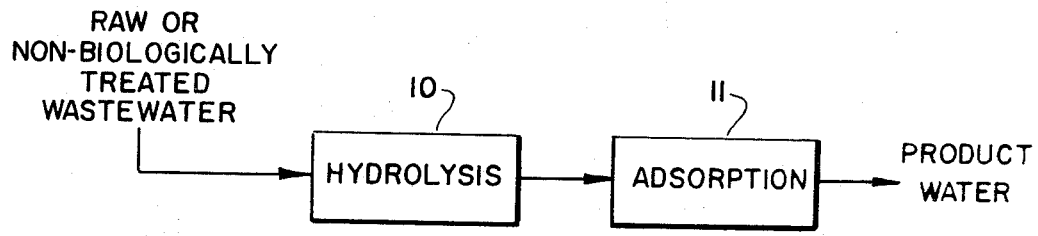
FIG. 1 is a functional flow diagram of the basic steps of the process.

The simplified flow diagram of FIG. 1 shows the two essential steps in the treatment of waste water in accordance with the invention. As indicated in FIG. 1, this process is intended to operate directly upon raw waste water or nonbiologically treated waste water, thus avoiding the costly and time-consuming sequence of primary and secondary treatment processing. The process is suitable for industrial and municipal waste waters and produces a product water which is suitable for reuse or disposal to any receiving environment.

In the first step of the process, soluble organic molecules in the waste water are hydrolyzed 10, preferably by chemical means, and suspended solid material may be settled out. Hydrolysis, in this sense, refers to the breaking up of high molecular weight soluble molecules of biological origin into their small molecular weight components. For example, the proteins and polysaccharides, which characterize such waste products, are broken down into their components such as amino acids and mono- and di-saccharides.

Proteins and polysaccharides, as well as other soluble organic materials such as polypeptides, fatty acids and the like are generally known to have molecular weights in excess of 2,000 or 3,000 to as high as two or three million and possible even higher. It is further known that when these materials are hydrolyzed, a hydrolyzed product is obtained such as amino acids, mono- and di-saccharides, simple organic acids and the like. It is still further known that these products of hydrolysis will normally have a molecular weight of less than 2,000 and generally less than 1200 to around 200 to 400.

These molecular weights approximate rather closely those reported by means of standard liquid-solid chmatographic techniques.

For purposes of this invention, the soluble high molecular weight organic materials can therefore be said to have molecular weight in excess of 2,000 or more normally in excess of 1,200 while the hydrolyzed soluble low molecular weight material will have a molecular weight of less than 2,000 and more normally less than 1,200 . In many instances, the molecular weight of the hydrolyzed product will be predominantly at around the 400 level.

It has been found that the average waste water contains a distribution of such molecules of various molecular weights. The distribution of molecules, however, is not uniform and most molecules appear to be centered in the upper and lower portion of the molecular weight-size range of interest. Because absorption by activated carbon and other absorbers requires that the absorbed molecules enter the pores of the carbon, the larger of these molecules are generally not absorbed. It is these larger molecules that the hydrolysis process breaks down so as to put them in a condition to be more readily absorbed.

In accordance with the invention, hydrolysis may be accomplished in any one of several ways. In a preferred embodiment of the invention, hydrolysis is accomplished by the addition of lime as calcium hydroxide, mixing, and detention for a period of time. The use of lime for hydrolysis has the collateral advantages of precipitating out solids and adjusting the pH of the solution to prepare for ammonia stripping if desired. However, it is to be understood that other chemicals may be employed to accomplish hydrolysis, although they may not have the advantages of precipitating out solids. For example, bases such as sodium hydroxide or acids such as sulfuric acid could be employed. Additionally, hydrolysis may be accomplished by electrolytic adjustment of the solutions pH or by the addition of hydrolytic enzymes.

After hydrolysis, the water is applied to an appropriate absorbing agent 11, for example activated carbon, which will absorb virtually all soluble organic material in the water. Due to the increased concentration of small or absorbable molecules which have a low intraparticle resistance in the pores of the absorber, the efficiency of the absorbing material is substantially increased. The absorbing material may then be regenerated and returned to the absorption stage of the process in accordance with well known techniques.

Figure 2:
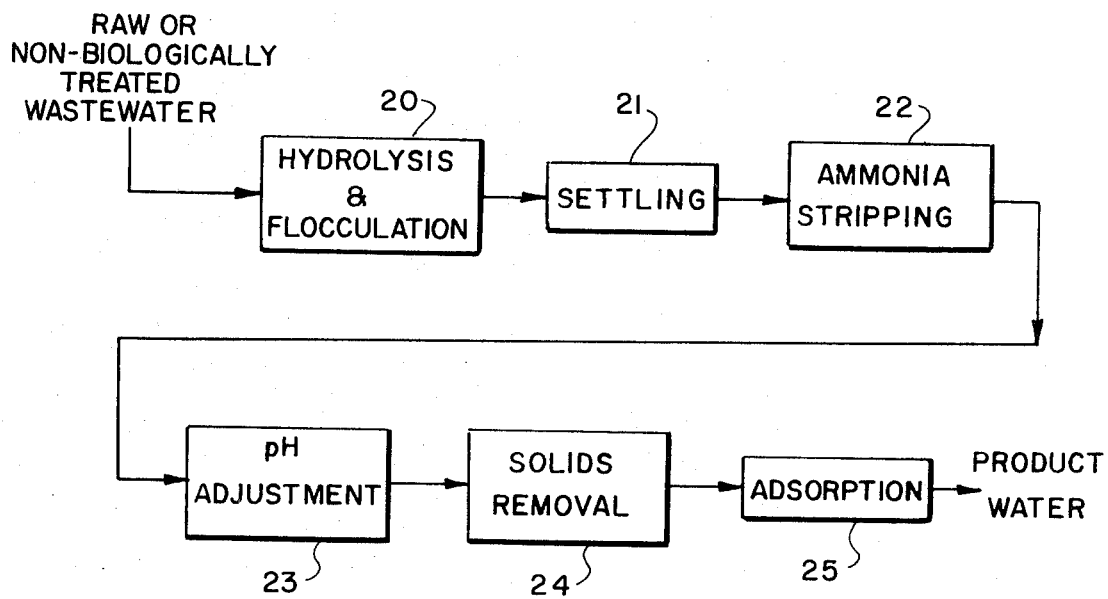
FIG. 2 is a flow diagram for a waste water treatment process in accordance with the invention showing additional steps which may be employed to further purify the product water.

A more detailed waste water treatment system arranged in accordance with the invention is shown in FIG. 2

Figure 3:
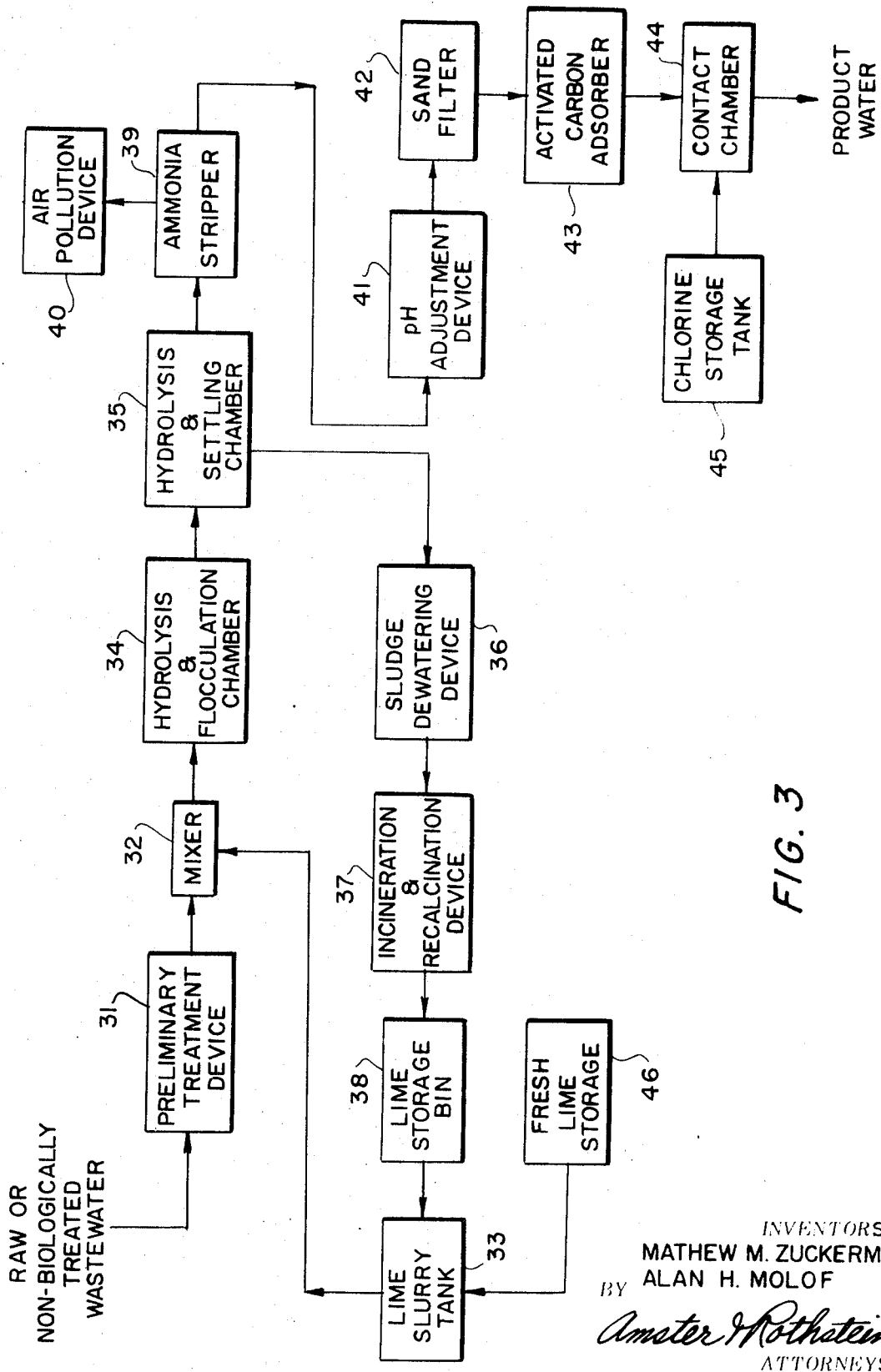
FIG. 3 shows a more complex apparatus for treating waste water arranged in accordance with the invention.

The arrangement shown in FIG. 2 and 3 employs individual components which are each well known in the water and waste water processing art and thus the individual components will not be described in detail.

Here again, the input to the system is raw or nonbiologically treated waste water preferably taken directly from industrial or municipal sources. The water is first applied to hydrolysis and flocculation device where coagulant and hydrolysis chemicals are added to the waste water ( 20 ) As indicated, calcium hydroxide is a preferable hydrolysis agent However, it also aids in precipitation of suspended solids. However, it is to be understood that other chemical substances may be employed. For example, sodium hydroxide or sulfuric acid as indicated above. When such other chemicals are used, additional coagulant chemicals may be added to effect solids removal.

In the hydrolysis and flocculation step 20 and environment is created wherein large soluble organic molecules are broken apart and suspended solids are coagulated into settleable flocs. The mixture is then transferred to a settling device, of a type well known in the art, where the mixture is detained for a period of time. The detention permits suspended solids to settle out (21) and allows additional time for hydrolysis to be substantially completed. As in normal settling devices, the chemical flocs are separated from the clarified waste water for possible processing by incineration or other means.

The clarified waste water, which now has a high pH, is then fed to an ammonia stripping device of a type well known in the waste water processing art. This device forces air through the liquid thus removing nitrogen in the form of ammonia gas (22). These exhaust gases should be processed in an appropriate air pollution device. The substantially denitrified liquid from the ammonia stripping process may then be mixed (23) with solid, liquid or gaseous chemicals to adjust the pH to approximately normal level. The pH adjusted residue may if necessary hen be applied to a solids removal unit, either a sand filter or other, wherein any remaining suspended solids will be substantially removed (24). The sand may be reprocessed in accordance with techniques well known in the water and waste water processing arts.

The water is now ready for absorption. Following the solids removal step 24 the water is conducted to an absorbing device wherein it is passed through an appropriate absorbing material (25) such as activated carbon. The carbon absorber substantially removes the soluble organic material present in the water. If activated carbon is employed, it is to be understood that it may be in either the granular or powdered form. Since the rate of absorption is in part controlled by the rate of diffusion of solute within the carbon particles, powdered carbon will perform slightly better than granular carbon. In either case, the fact that large soluble organic molecules in the solute have been hydrolyzed and the large molecular weight molecules broken down into small molecules which have a low intraparticle resistance in the carbon pores greatly aids the absorption process.

The product water from the absorption device may be stored or discharged into a waterway or other receiving environment. Because of the high quality of the product water, it may also be recycled to the industrial and municipal water system from which it was originally derived and may be reused. It has been found that the product of this process, which does not include primary or secondary treatment, surpasses the quality of water produced by the sequence of primary, secondary and tertiary treatment.

It is to be understood that numerous efficiency techniques may be applied to a system such as that shown in FIG. 2 to reduce the cost of operating a waste water treatment plant such as described. FIG. 3 shows a more complete treatment system constructed in accordance with the invention including additional desirable features.

In the arrangement shown in FIG. 3, nonbiologically treated waste water is applied to a preliminary treatment device 31 which may include a bar screen or other suitable device to remove large objects. It may additionally include a grit chamber or other device for removal of settleable inorganic matter. The filtered mixture then travels to a mixing chamber 32 to which lime from lime slurry tank 33 is added. The lime-water mixture is detained in the mixing chamber for an average period of approximately several minutes, after which it is conducted to the hydrolysis and flocculation chamber 34. Here the solution is detained for an average period of approximately several minutes to half an hour during which time the hydrolysis of large soluble organic material takes place while chemical flocs are permitted to grow in size. The water is then conducted to a hydrolysis and settling chamber 35 where it is detained for an average period of several minutes to half an hour. The detention in the settling chamber and in the flocculation chamber permits substantial completion of the hydrolysis process and allows chemical sludge to be separated from the water, removing with it coagulated suspended solids and phosphates.

Associated with the hydrolysis settling chamber 35 and the lime slurry tank 33 there may be a reclamation arrangement as follows: the sludge from the bottom of hydrolysis and settling chamber 35 may be pumped to a dewatering device 36 in which most of the water is removed from the sludge and discharged. The dewatered sludge is then passed to an incineration and recalcination device 37 where the organic material in the sludge is burned as a fuel to substantially sustain the recalcination of the lime which is employed along with fresh lime from storage bin 46 in the slurry tank 33 and mixing chamber 32. The recalcinated lime is best stored in an appropriate bin 38 for reintroduction into lime slurry tank 33.

The solution may then be applied to an ammonia stripper 39 including an appropriate air pollution device 40. The ammonia stripped solution is then applied to a pH adjustment device 41 where it is mixed with suitable materials, such as carbon dioxide, to adjust the pH to normal values.

The solution is next conducted to sand filter 42 where suspended solids are substantially removed. After sand filtration, the water is applied to activated carbon absorber 43 where the soluble organic material in the water is substantially removed. As indicated in connection with FIG. 2, activated carbon absorption is significantly aided by the hydrolysis process which occurred in chambers 34 and 35.

The output of the activated carbon absorber may be delivered to contact chamber 44 where chlorine or other disinfectant chemicals from storage tank 45 are added to the water at a rate of several parts per million. The water is retained in a chlorine contact chamber for approximately several minutes to half an hour which affords sufficient contact time to substantially kill the pathogenic organisms present in the water. The output of chlorine contact chamber 44 is a product water which may be reused or disposed of as desired.

It is to be understood that the embodiments described above are merely examples of the application of the principles of the invention. Additional embodiments may be devised by those skilled in the art without departing from the spirit or scope of the invention.

What is claimed is:

1. A process for treating nonbiologically treated waste water of the type containing relatively high molecular weight soluble organic materials such as proteins, polysaccharides and the like, comprising the steps of hydrolyzing said soluble high molecular weight materials to yield a hydrolyzed product readily absorbable on a porous absorbing material which product contains low molecular weight soluble organic materials such as amino acids and mono- and di-saccharides and absorbing said hydrolyzed product on a porous absorbing material.

2. The process of claim 1 wherein the absorbent material is activated carbon.

3. The process of claim 1 wherein a major portion of the high molecular weight soluble molecules comprise proteins and polysaccharides and the hydrolyzed low molecular weight materials comprise amino acids and mono- and di-saccharides.

4. The process of claim 1 wherein the hydrolysis comprises adjusting the pH level of the waste water to a pH conducive to hydrolysis and maintaining said pH for a period of time sufficient to achieve substantially complete hydrolysis.

5. The process of claim 1 including the step of coagulating colloidal matter in the waste water to form a floc, holding the waste water to settle said floc, and removing said settled floc from the waste water prior to said absorbing step.

6. The process of claim 4, wherein the step of adjusting the pH of said waste water is achieved by adding hydrolyzing amounts of an alkali.

7. The proceeds of claim 6 wherein the alkali is calcium hydroxide.

8. The process of claim 4 wherein the step of adjusting the pH of said waste water is achieved by adding hydrolyzing amounts of an acid.

9. The process of claim 8 wherein the acid is sulfuric acid.

10. The process of claim 3 wherein the step of hydrolyzing is achieved by adding to said waste water hydrolytic enzymes.

11. A process for treating nonbiologically treated waste water of the type containing high molecular weight soluble organic materials having a molecular weight of greater than 2,000 comprising hydrolyzing substantially all of said high molecular weight soluble organic materials to yield a hydrolyzed product readily absorbable on a porous absorbing material which product contains low molecular weight organic materials having a molecular weight of less than 2,000 and absorbing said hydrolyzed product on a porous absorbing material.

12. The process of claim 11 wherein the hydrolyzed low molecular weight materials exhibit a low intraparticle pore resistance to an absorbing material.

13. A process for treating nonbiologically treated waste water of the type containing high molecular weight soluble organic materials having a molecular weight of greater than 1,200 comprising hydrolyzing substantially all of said high molecular weight soluble organic materials to yield a hydrolyzed product readily absorbable on an absorbing material which product contains low molecular weight organic materials having a molecular weight of less than 1,200 and absorbing said hydrolyzed product on a porous absorbing material.

14. A process for treating nonbiologically treated raw waste water such as proteins, polysaccharides and the like comprising the steps of
  1. Adding calcium hydroxide to said raw waste water in amounts sufficient to initiate hydrolysis of said soluble high molecular weight materials;
  2. detaining said waste water for a period of time sufficient to hydrolyze said soluble high molecular weight materials to readily absorbed low molecular weight materials such as amino acids and mono- and di-saccharides and to effect coagulation;
  3. removing coagulated insolubles from the waste water; and
  4. contacting said waste water with activated carbon so as to substantially remove the soluble hydrolyzed organic material therefrom.

15. A process for treating raw waste water containing insoluble organic and inorganic matter and soluble high molecular weight organic materials having a molecular weight in excess of 1,200 comprising the steps of
  1. removing large objects and settleable organic and inorganic matter from the raw waste water,
  2. mixing the raw waste water with lime in the form of calcium hydroxide to obtain a pH level sufficient to cause hydrolysis of said soluble high molecular weight organic materials,
  3. detaining the lime treated water for a period of time sufficient to hydrolyze the high molecular weight soluble organic materials to organic materials having a molecular weight of less than 1,200 and which are readily absorbed on porous activated carbon,
  4. separating any insoluble materials produced during hydrolysis,
  5. stripping ammonia from said mixture,
  6. adjusting the pH of said waste water toward normal,
  7. contacting said waste water with activated carbon to absorb said hydrolyzed low molecular weight soluble organic materials,
  8. separating the waste water from the activated carbon, and
  9. subjecting said waste water to action of a disinfectant.

* * * * *

UNITED STATES PATENT OFFICE
CERTIFICATE OF CORRECTION

Patent No. 3,635,817          Dated January 18, 1972

Inventor(s) Mathew M. Zuckerman, et. al.

It is certified that error appears in the above-identified patent and that said Letters Patent are hereby corrected as shown below:

Column 1, line 47, "absorption" should read
-- adsorption -- ; line 70, "absorber" should read -- adsorber --
line 72, "absorbed" should read -- adsorbed -- . Column 2,
line 56, "absorption" should read -- adsorption -- ; line 56,
"absorbers" should read -- adsorbers -- ; line 57, "absorbed"
should read -- adsorbed --; line 58, "absorbed" should read
-- adsorbed -- ; lines 60-61, "absorbed" should read
-- adsorbed -- . Column 3, lines 1-2, "absorbing" should read
-- adsorbing -- ; line 4, "absorbable" should read -- adsorbable --
line 6, "absorber" should read -- adsorber -- ; line 6,
"absorbing" should read -- adsorbing -- ; line 7, "absorbing"
should read -- adsorbing -- ; line 8, "absorption" should read
-- adsorption -- ; line 47, "hen" should read -- then -- ; line
52, "absorption" should read -- adsorption -- ; line 53,
"absorbing" should read -- adsorbing -- ; line 54, "absorbing"
should read -- adsorbing -- ; line 55, "absorber" should read
-- adsorber -- ; line 59, "absorption" should read
-- adsorption -- ; lines 65-66, "absorption" should read
-- adsorption -- ; line 67, "absorption" should read
-- adsorption -- . Column 4, line 48, "absorber" should read
-- adsorber -- ; line 51, "absorption" should read
-- adsorption -- ; line 53, "absorber" should read
-- adsorber -- ; line 73, "absorbable" should read
-- adsorbable -- ; line 73, "absorbing" should read
-- adsorbing -- . Column 5, line 1, "absorbing" should read
-- adsorbing -- ; line 1, "absorbing", second occurrence, should
read -- adsorbing -- ; line 3, "absorbent" should read
-- adsorbent -- ; line 17, "absorbing" should read
-- adsorbing -- ; line 21, "proceeds" should read -- proceds -- ;
line 35, "absorbable" should read -- adsorbable -- ; line 35,
"absorbing" should read -- adsorbing -- ; lines 37-38,
"absorbing" should read -- adsorbing -- , in both occurrences;

UNITED STATES PATENT OFFICE
CERTIFICATE OF CORRECTION

Patent No. 3,635,817      Dated January 18, 1972

Inventor(s) Mathew M. Zuckerman, et. al.

It is certified that error appears in the above-identified patent and that said Letters Patent are hereby corrected as shown below:

Column 5, line 42, "absorbing" should read -- adsorbing --. Column 6, line 1, "absorbable" should read -- adsorbable -- ; lines 1, 3 and 4, all occurrences "absorbing" should read -- adsorbing -- ; line 14, "absorbed" should read -- adsorbed -- ; line 35, "absorbed" should read -- adsorbed -- ; lines 41-42, "absorb" should read -- adsorb -- .

Signed and sealed this 12th day of December 1972.

(SEAL)
Attest:

EDWARD M. FLETCHER, JR.      ROBERT GOTTSCHALK
Attesting Officer      Commissioner of Patents